UNITED STATES PATENT OFFICE.

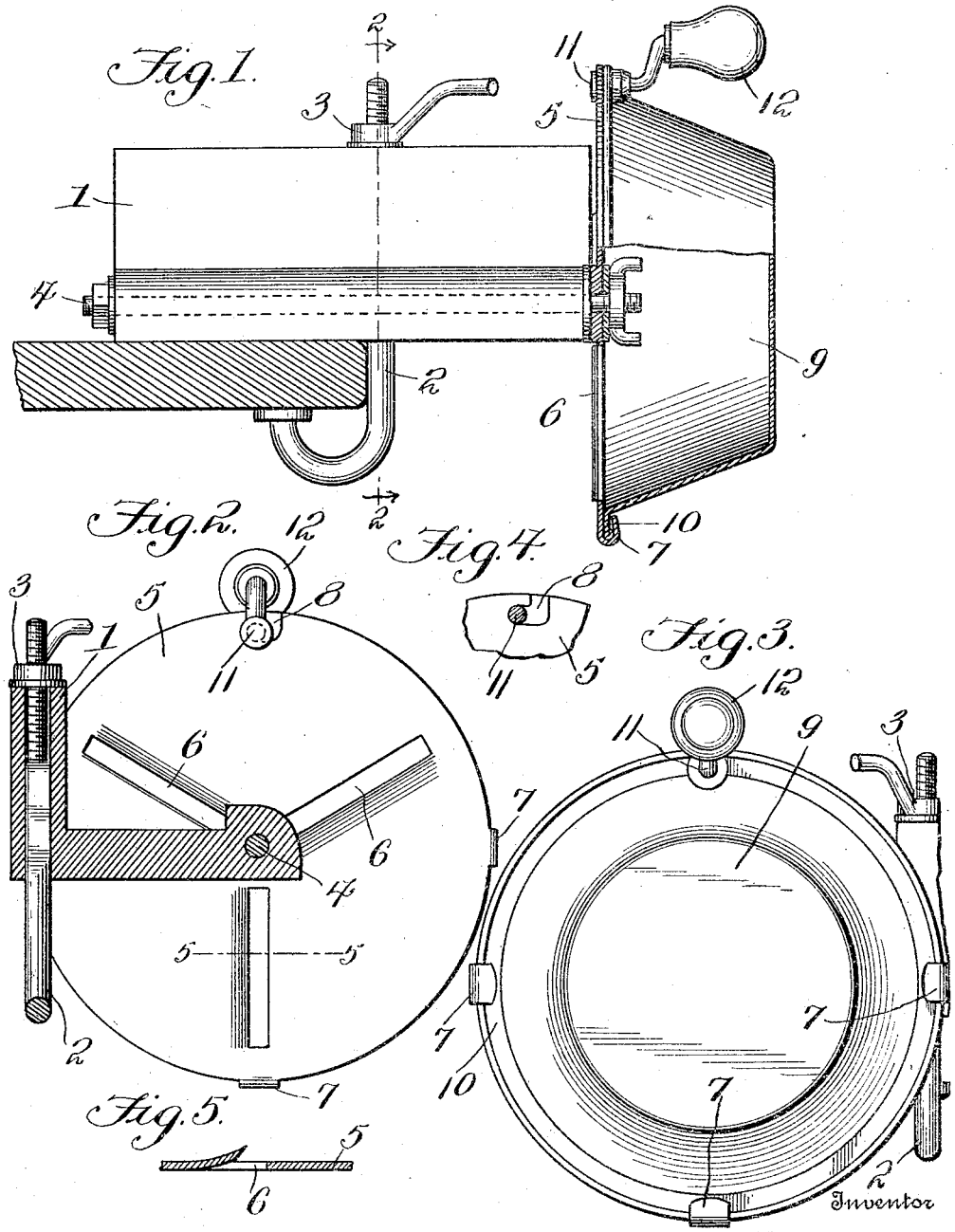

ULYSSES S. HICKS, OF HILTS, CALIFORNIA.

VEGETABLE-SLICER.

1,212,055.         Specification of Letters Patent.         Patented Jan. 9, 1917.

Application filed August 16, 1916. Serial No. 115,292.

*To all whom it may concern:*

Be it known that I, ULYSSES S. HICKS, a citizen of the United States, residing at Hilts, in the county of Siskiyou and State of California, have invented new and useful Improvements in Vegetable-Slicers, of which the following is a specification.

This invention relates to vegetable slicers and it consists in the novel features hereinafter described and claimed.

An object of the invention is to provide a vegetable slicer of simple and durable structure adapted to be applied to the top of a table and having means manually operable to reduce the vegetable to slices as they are presented to the cutting blades of the slicer. The slicer also includes a pan in which the slices are collected or accumulated and the pan is detachable from the blade portion of the slicer and when moved from the same may be placed upon its bottom upon a flat surface with the slices therein.

With this object in view the slicer includes a trough shaped body having a clamp member attached thereto and which is adapted to engage under the top of a table. A shaft is journaled at the edge of the trough member and a disk is mounted upon the said shaft. The said disk is provided with a series of radially disposed openings having cutting portions forming one edge of the said opening. The said cutting portions are slightly offset with relation to the plane of the disk. The said disk is further provided at its edge with inturned lugs and an L-shaped slot. The pan is provided with an outstanding rim adapted to be received in the lugs and a pin having a head portion adapted to be received in the said slot. The said pin also serves as a handle whereby the pan and the disk may be rotated during the cutting or slicing operation.

In the accompanying drawing:—Figure 1 is a side elevation of the vegetable slicer with parts in section; Fig. 2 is a transverse sectional view of the same cut on the line 2—2 of Fig. 1. Fig. 3 is an end view of the same. Fig. 4 is a detailed fragmentary view of parts of the same. Fig. 5 is a detailed sectional view of part of the same cut on the line 5—5 of Fig. 2.

The vegetable slicer comprises a trough shaped body 1 having a clamp member 2 forwardly mounted at one side thereof. A nut 3 is screwed upon one end of the member 2 and may be used for drawing the opposite end of the said member toward the said body whereby the body may be clamped into position upon the top of a table or other support.

A shaft 4 is journaled for rotation at one edge portion of the body 1 and a disk 5 is mounted at one end of the shaft 4. The said disk 5 is provided with a series of radially disposed openings 6, the portions of the disk 5 at one edge of the opening 6 is slightly offset with relation to the plane of the disk and the said offset edge portions are sharpened and thereby forming cutting blades at the edges of the openings. The disk 6 is provided at its periphery with three inturned lugs 7 and a single L-shaped slot 8. A pan 9 is used in conjunction with the parts hereinbefore described and the said pan is provided with an outstanding flange 10 which is adapted to be received in the spaces between the lugs 7 and the side of the disk 5. A pin 11 passes transversely through the flange 10 of the pan and the head portion of the said pin is adapted to be received in the L-shaped slot 8 provided in the peripheral portion of the disk 5. The pin 8 also serves as a handle upon which is mounted a knob 12.

When the body 1 is secured in position upon the top of a table or other support the vegetables are passed along the bottom of the said body toward the disk 5. The operator by using the pin 12 rotates the disk 5 and the pan 9 whereby the cutting edges of the sides of the slots are brought into contact with the vegetables and the vegetables are reduced to slices which pass through the openings 6 and lodge in the pan 9.

When the vegetables have been sufficiently sliced the disk 5 is held at a stationary position and the pan 9 is turned slightly with relation to the disk whereby the head portion of the pin 11 is moved away from the inner end of the L-shaped slot 8 in the peripheral portion of the said disk. The said pin may then be slipped laterally out of the slot and at the same time the flange of the pan 8 is slipped from the spaces between the lugs 7 and the adjacent surface of the disk 5. Thus the pan and its contents are detached from the said disk.

From the foregoing description taken in conjunction with the accompanying drawing, it will be seen that a vegetable slicer of simple and durable structure is provided and that the same may be conveniently used for economically and easily reducing vegetables to slices preparatory to cooking or for other purposes.

Having described the invention what is claimed is:—

1. A vegetable slicer comprising a body, a shaft journaled therein, a disk fixed to the shaft and having radially disposed openings provided with sharp edges, inturned lugs carried by the disk, the said disk being provided at its periphery with an L-shaped slot, a pan having an outstanding rim adapted to fit between the lugs and the disk and a pin having a head portion passing through the flange of the pan and adapted to enter the L-shaped slot in the disk.

2. A vegetable slicer comprising a body, a shaft journaled therein, a disk fixed to the shaft and having radially disposed openings provided with sharp edges, said disk having inturned lugs, said disk having at its periphery an L-shaped slot, a pan having an outstanding flange adapted to fit between the lugs and the disk, a pin passing transversely through the flange of the pan and having a head portion adapted to enter the L-shaped slot of the disk, said pin being spaced from the outer side of the pan whereby it might be used as a handle and a knob mounted upon the pin.

In testimony whereof I affix my signature.

ULYSSES S. HICKS.

Copies of this patent may be obtained for five cents each, by addressing the "Commissioner of Patents, Washington, D. C."